US012639720B2

(12) United States Patent
Ray et al.

(10) Patent No.: US 12,639,720 B2
(45) **Date of Patent: \*May 26, 2026**

(54) AI-BASED COMPUTER RECORD COMPLIANCE MANAGEMENT SYSTEM AND METHOD

(71) Applicant: Corelogic Solutions, LLC, Irvine, CA (US)

(72) Inventors: Daniel W. Ray, Irvine, CA (US); Barbara McCollam, Irvine, CA (US); Richard Smirl, Irvine, CA (US); Libor Viktorin, Irvine, CA (US); Matthew Johnson, Irvine, CA (US); David Beadle, Irvine, CA (US); Frankie Gonzales, Irvine, CA (US); Roger Goodman, Irvine, CA (US); Albert Noble McElmon, III, Irvine, CA (US)

(73) Assignee: CORELOGIC SOLUTIONS, LLC, Irvine, CA (US)

( \* ) Notice: Subject to any disclaimer, the term of this patent is extended or adjusted under 35 U.S.C. 154(b) by 204 days.

This patent is subject to a terminal disclaimer.

(21) Appl. No.: 17/986,924

(22) Filed: Nov. 15, 2022

(65) Prior Publication Data

US 2023/0076655 A1     Mar. 9, 2023

Related U.S. Application Data

(63) Continuation of application No. 17/900,977, filed on Sep. 1, 2022.

(60) Provisional application No. 63/240,622, filed on Sep. 3, 2021.

(51) Int. Cl.
| | |
|---|---|
| *G06Q 30/018* | (2023.01) |
| *G06N 3/045* | (2023.01) |
| *G06N 3/08* | (2023.01) |
| *G06Q 10/105* | (2023.01) |
| *G06Q 50/16* | (2024.01) |

(52) U.S. Cl.
CPC ........... *G06Q 30/018* (2013.01); *G06N 3/045* (2023.01); *G06N 3/08* (2013.01); *G06Q 10/105* (2013.01); *G06Q 50/16* (2013.01)

(58) Field of Classification Search
None
See application file for complete search history.

(56) References Cited

U.S. PATENT DOCUMENTS

| | | | | |
|---|---|---|---|---|
| 8,479,302 B1 * | 7/2013 | Lin | .......................... | G06F 21/62 |
| | | | | 713/168 |
| 8,996,441 B2 * | 3/2015 | Cole | ..................... | G06F 16/254 |
| | | | | 706/45 |
| 2001/0032094 A1 * | 10/2001 | Ghosh | .............. | G06Q 10/06375 |
| | | | | 705/317 |

(Continued)

*Primary Examiner* — Patrick McAtee
*Assistant Examiner* — Christine Dang
(74) *Attorney, Agent, or Firm* — XSENSUS LLP

(57)               ABSTRACT

A system, and method perform compliance checking of computer records for MLS services. The compliance checking includes detecting multiple-listing-service (MLS) contract compliance with a MLS, gathering MLS-related data regarding an MLS subscriber from at least one database, checking for a non-compliance incident of the MLS-related data with the MLS service requirements, and in response to detection of a non-compliance incident, trigger a computer-based resolution process to resolve the non-compliance incident.

17 Claims, 12 Drawing Sheets

(56)     References Cited

U.S. PATENT DOCUMENTS

| | | | |
|---|---|---|---|
| 2003/0083994 A1* | 5/2003 | Ramachandran ....... | G06F 21/10 |
| | | | 705/52 |
| 2007/0198326 A1* | 8/2007 | Johnson ................ | G06Q 30/02 |
| | | | 705/7.39 |
| 2008/0270207 A1* | 10/2008 | Santos .................. | G06Q 10/10 |
| | | | 705/7.41 |
| 2009/0299791 A1* | 12/2009 | Blake ................... | G06Q 20/102 |
| | | | 705/40 |
| 2013/0290200 A1* | 10/2013 | Singhal ............... | G06Q 30/018 |
| | | | 705/317 |
| 2014/0222696 A1* | 8/2014 | Ashby .................. | G06Q 50/16 |
| | | | 705/313 |
| 2016/0314545 A1* | 10/2016 | Jessen ............... | G06Q 30/0278 |
| 2017/0357784 A1* | 12/2017 | Duda .................. | G06F 21/105 |
| 2020/0076814 A1* | 3/2020 | Cohen .................... | H04L 63/08 |

* cited by examiner

License Incident Management

| Contract ID | Technology Provider | Broker / Agent | Reason | Display URL(s) |
|---|---|---|---|---|
| 123123 | Constellation Web Services | Mike Nesmith / Peter Tork | Agent suspended in MLS | http://totohomes.com |
| 14235 | Gabriels Technology | Steve Sleeve | Connection Suspended by MLO | http://whatsupcoursleeve.com |
| 351323 | New Vendor You've Never Heard Of, Inc. | Rondo Broker | Broker Office Missing from Roster | http://randomrealty.com |
| 122341 | Bloomtown | Emily Boardmember / Sarah Housesaller | Contract Disabled by TP | http://buyahomeorhomes.com |
| 198844 | Local Web Dev Shop, LLC | Gary Gygax | TP has not pulled data in >12 hours | http://vividrealty.com |

Figure 1A

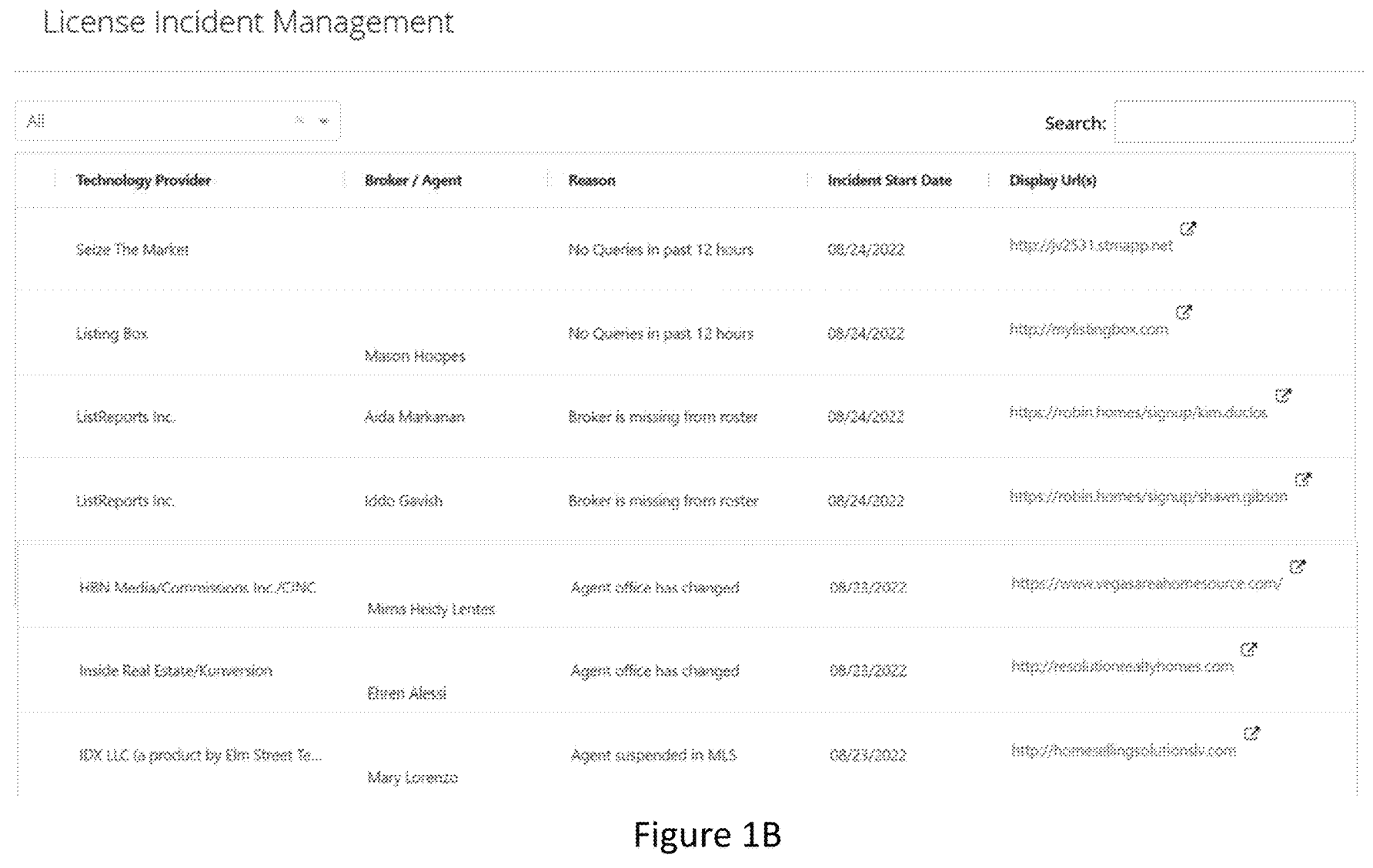

License Incident Management

Search:

| Technology Provider | Broker / Agent | Reasons | Incident Start Date | Display Url(s) |
|---|---|---|---|---|
| Seize The Market | | No Queries in past 12 hours | 08/24/2022 | http://p2031.seizeapp.net |
| Listing Box | Mason Hoopes | No Queries in past 13 hours | 08/24/2022 | http://mylistingbox.com |
| ListReports Inc. | Adila Mahoman | Broker is missing from roster | 08/24/2022 | https://prelim.homes4sale.signupbase.photo.domain |
| ListReports Inc. | Julia Garib | Broker is missing from roster | 08/24/2022 | https://prelim.homes4sale.signup.photosource.photo |
| HBM Media/Commissions Inc./CPAC | Mona Hadoy Lareau | Agents office has changed | 08/23/2022 | https://www.myagentsalesablepreviousource.com/ |
| Inside Real Estate/Kunversion | Elena Alexii | Agents office has changed | 08/23/2022 | http://myrealestate.com.realtyprohouse.com |
| IDX LLC (a product by Elm Street Te... | Mary Lorenzo | Agent suspended in MLS | 08/23/2022 | http://homesellingpublicrealestate.com |

Figure 1B

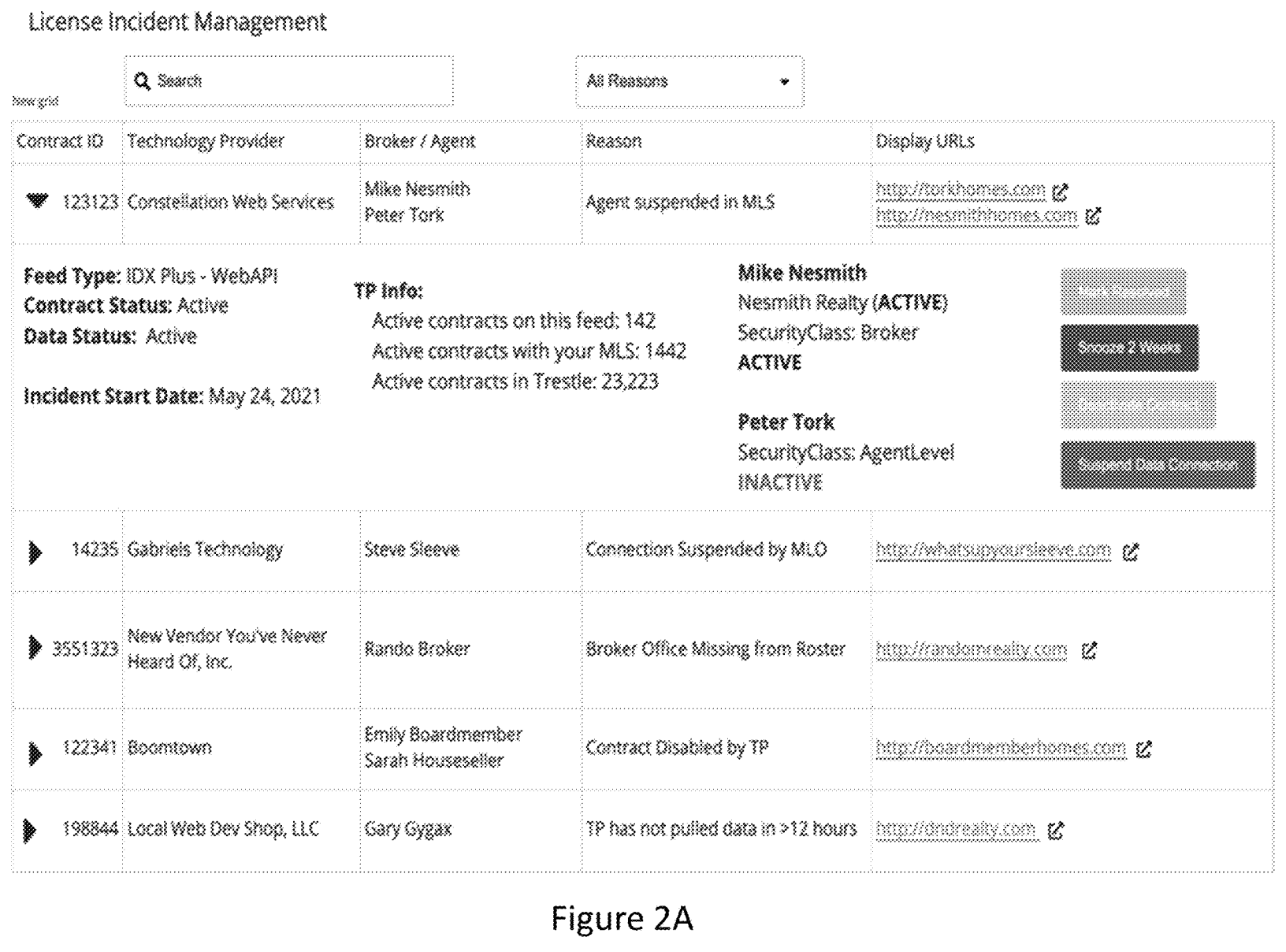

License Incident Management

Q Search

All Reasons ▾

| Contract ID | Technology Provider | Broker / Agent | Reason | Display URLs |
|---|---|---|---|---|
| 123123 | Constellation Web Services | Mike Nesmith, Peter Tork | Agent suspended in MLS | http://monkhomes.com, http://nesmithhomes.com |
| 14235 | Gabriels Technology | Steve Sleeve | Connection Suspended by MLO | http://whatsupyourface.com |
| 3351323 | New Vendor You've Never Heard Of, Inc. | Rando Broker | Broker Office Missing from Roster | http://randamrealty.com |
| 122341 | Boomtown | Emily Boardmember, Sarah Housekeller | Contract Disabled by TP | http://boardmemberhomes.com |
| 198844 | Local Web Dev Shop, LLC | Gary Gygax | TP has not pulled data in >12 hours | http://gygaxrealty.com |

Feed Type: IDX Plus - WebAPI
Contract Status: Active
Data Status: Active

Incident Start Date: May 24, 2021

TP Info:
Active contracts on this feed: 142
Active contracts with your MLS: 1442
Active contracts in Trestle: 23,223

Mike Nesmith
Nesmith Realty (ACTIVE)
SecurityClass: Broker
ACTIVE

Peter Tork
SecurityClass: AgentLevel
INACTIVE

Figure 2A

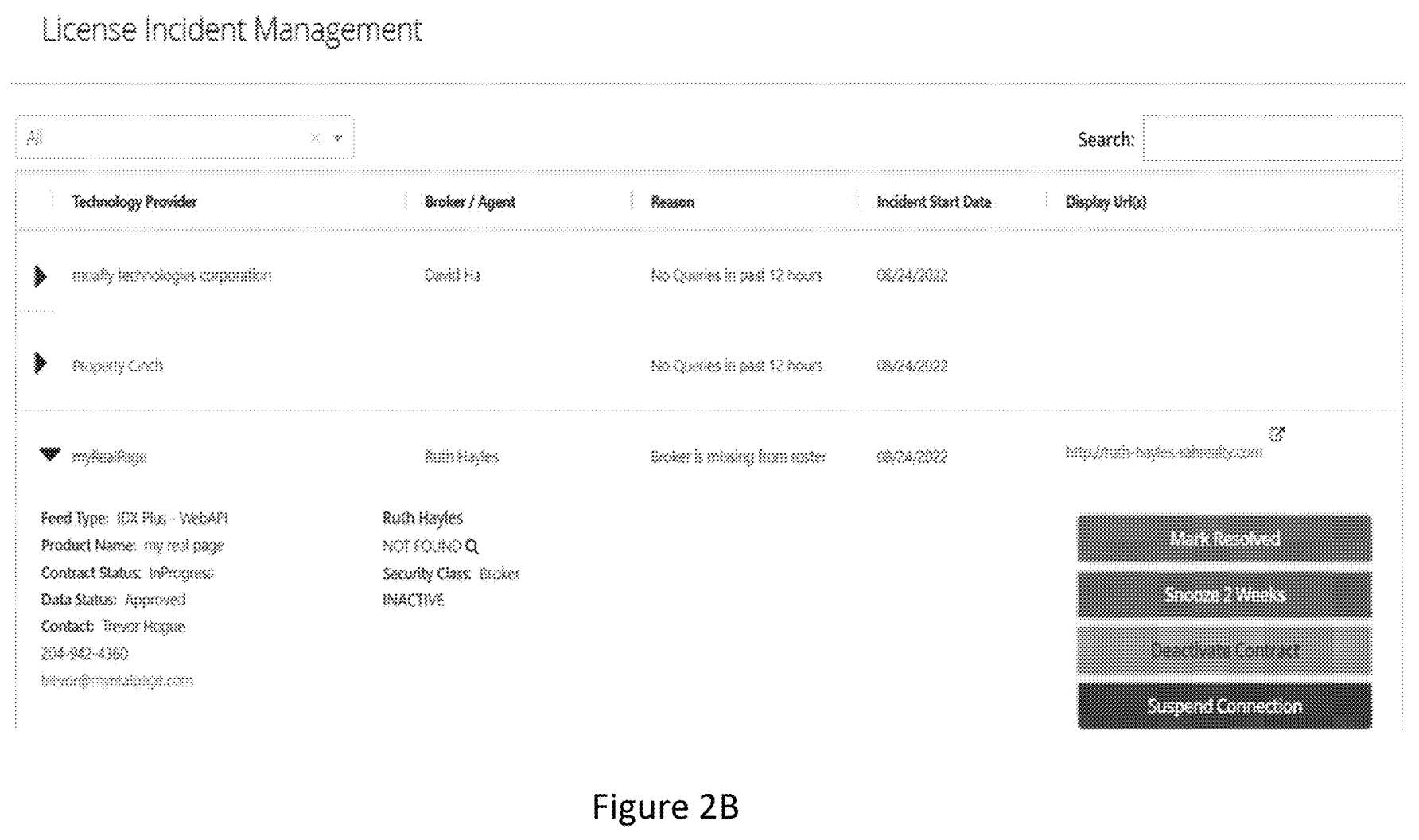

License Incident Management

Search:

| Technology Provider | Broker / Agent | Reason | Incident Start Date | Display Link(s) |
|---|---|---|---|---|

All simplify technologies corporation    David Ha    No Queries in past 12 hours    08/24/2022

Property Grids    No Queries in past 12 hours    08/24/2022 mytrustflags    Ruth Hayles    Broker is missing from roster    08/24/2022    http://mtn-hafns.alphabodyy.com Feed Type: IDX Plus - WebAPI
Product Name: my real page
Contract Status: InProgress
Data Status: Approved
Contact: Trevor Hogue
888-882-4360
trevor@propertiesdigger.com Ruth Hayles
NOT FOUND Q
Security Class: Broker
INACTIVE Edit Incident
Security Alerts
Delete
Suspend Connection

Figure 2B

| Company Name | TimeStamp | Client ID | MLOName |
|---|---|---|---|
| 30 | 31 | 32 | 33 |
| RRRR | 2020-11-06T03:14:40.285Z | AAA | SUMMIT |
| YYYY | 2020-12-14T22:42:59.257Z | BBB | SUMMIT |
| RRRR | 2020-02-26T03:33:33.114Z | AAA | SUMMIT |
| RRRR | 2021-07-25T15:54:42.421Z | AAA | SUMMIT |

Figure 3

AI-BASED COMPUTER RECORD COMPLIANCE MANAGEMENT SYSTEM AND METHOD

CROSS-REFERENCE TO RELATED APPLICATIONS

The present application is a continuation of U.S. application Ser. No. 17/900,977, filed Sep. 1, 2022, which claims the benefit of the earlier filing date of U.S. Provisional Application No. 63/240,622, filed Sep. 3, 2021, and contains subject matter related to that disclosed in U.S. application Ser. No. 16/516,727, and U.S. application Ser. No. 16/559,289, the entire contents of each of which being incorporated herein by reference in their entirety.

BACKGROUND

Technical Field

The present disclosure relates to artificial intelligence (AI) based computer records compliance management. In a non-limiting example, this disclosure relates to License Incident Manager (LIM) for CoreLogic's Product Data Marketplace (TRESTLE). The LIM is a software-based system that detects data events from relevant, but separate, data sources to detect issues that might need a multiple listing service's (MLS's) attention regarding its live, active data licenses.

Discussion of the Background

CoreLogic's TRESTLE product aggregates broad types of real estate data into one data set that can be consumed into real estate applications and services by our customers. Its dashboard tools automate the process of licensing data from organizations for data consumers and provide MESS with a platform upon which to digitize their license processes and documents. "The Product Data Marketplace Defender" is a suite of features that add onto a standard MLS TRESTLE account by adding tools and features to enhance an MLS's data security and contract compliance management beyond anything that was possible before.

SUMMARY

According to an aspect of the present disclosure, a new AI based compliance scheme is described for contract compliance for handling and maintenance of MLS data sets. Moreover, a system, and method, according to one embodiment, perform compliance checking of computer records for MLS services. The compliance checking includes detecting multiple-listing-service (MLS) contract (e.g., license) compliance with a MLS, gathering MLS-related data regarding an MLS subscriber from at least one database, training an AI engine to detect a non-compliance incident from input data that contains MLS service requirements as features of the input data that correspond to contractual obligations of the MLS subscriber under a MLS license, applying the MLS-related data to the AI engine, after the AI engine is trained, and checking for the non-compliance incident of the MLS-related data with respect to the MLS service requirements, and in response to detection of the non-compliance incident, triggering a computer-based resolution process to resolve the non-compliance incident.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1A is a graphical user interface (GUI) that provides access to data entries stored in memory and presents query results in tabular form for a license incident management (LIM) system according to an embodiment.

FIG. 1B is an alternate embodiment of a GUI for the LIM system.

FIG. 2A is a more extensive graphical listing of data entries from FIG. 1A, with the first listed entry for a particular contract ID selected and presented in more detail.

FIG. 2B is a more extensive graphical listing of data entries from FIG. 1B, with an entry for a particular technology provider selected and presented in more detail.

FIG. 3 is an exemplary access log excerpt used in an embodiment of the present disclosure.

DETAILED DESCRIPTION

Figures 1C, 1D:
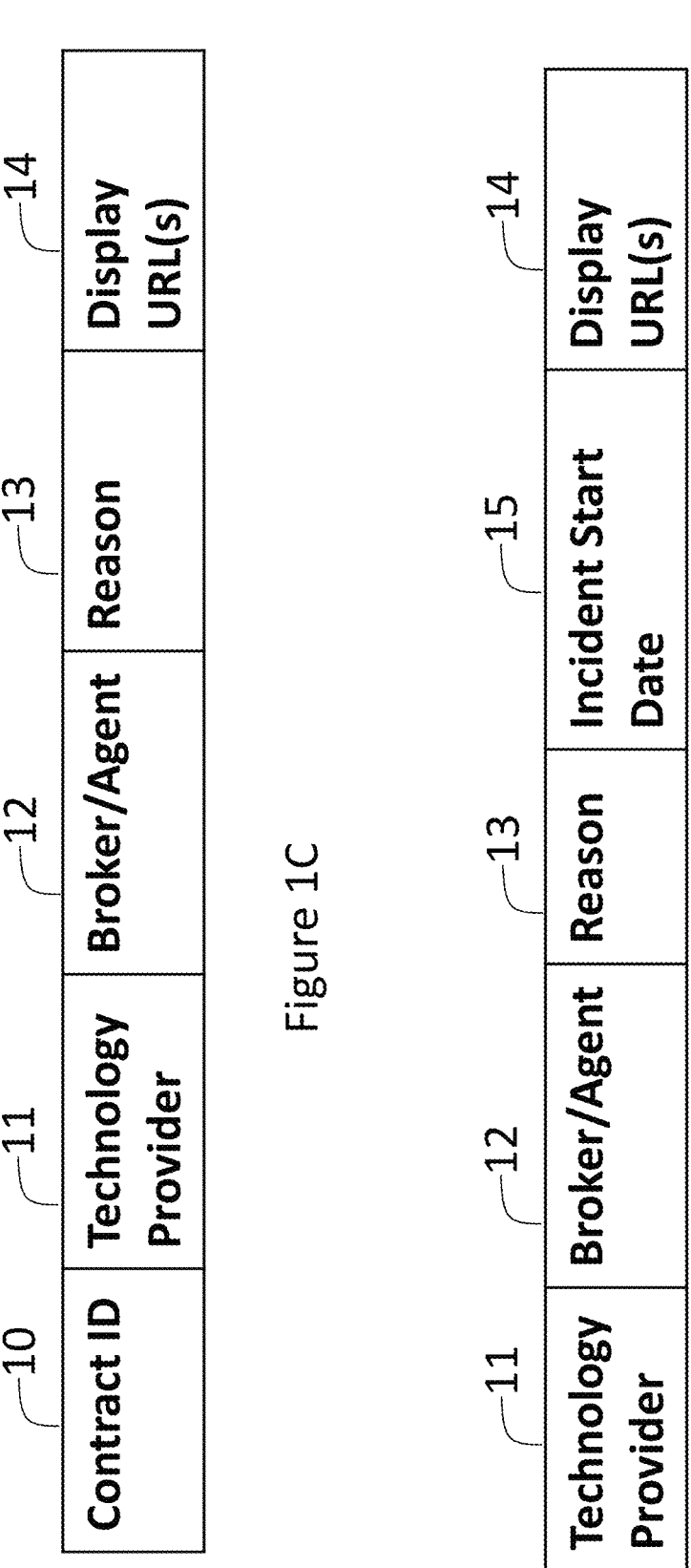
FIG. 1C is a data structure of data entries in the LIM system that are retrieved and presented as shown in the example of FIG. 1A.
FIG. 1D is an alternate data structure of data entries in the LIM system that are retrieved and presented as shown in the example of FIG. 1B.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least encoding and decoding in an image processing system.

As recognized by the present inventors, traditionally MLS data licensing was conducted via paper contracts for decades, leaving many organizations with filing cabinets full of language and no easy way to connect it to changes in the real world. For instance, often the license terms might require that data is available only to MLS members in good standing, but when a signer of one of these licenses fell into a suspended status for nonpayment there was no good way to connect that fact with the data license, or the task of shutting off data access to the MLS. Alternatively, a license may be co-signed by an agent and their office's head broker, and so if an agent changes brokerages, that unsets the signing authority on their existing licenses.

Even worse, access to the data itself might not be terminated either, resulting in unlicensed leakage of the data that is the heart of the MLS's value. This is less than ideal even if one licensee is left in this state; in large MLS markets with hundreds of thousands of agents, this problem takes on significant scale and risk. Until now there has been no simple, automatic approach for dealing with it.

In addition, when a contract is terminated or data connection is suspended, the MLS should visit the display URL listed on the license to check that MLS data is no longer being displayed. A data connection (between an MLS and a Vendor) might contain many licenses, one for each customer of the Vendor. The MLS should visit each of those URLs to ensure compliance with the data termination. Some example MLS data licensing requirements are provided as Attachment 1 in U.S. provisional patent application 63/240,622, previously cited and incorporated by reference. However, the basic rules (that any MLS-local terms would extend) are in the National Association of Realtors (NAR), Handbook on Multiple Listing Policy, "Advertising (Print and Electronic), Section 1: Internet Data Exchange (IDX), Policy statement 7.58)", Jan. 1, 2021, the entire contents of which being incorporated herein by reference. Electronic copies of the policy are publicly available from the NAR at https://www.nar.realtor/handbook-on-multiple-listing-policy/advertising-print-and-electronic-section-1-internet-data-exchange-idx-policy-policy-statement-7-58.

An excerpt of this document, accessed from the above URL, is as follows:

Policies Applicable to Participants' IDX Sites

Participants must notify the MLS of their intention to display IDX information and give the MLS direct access for purposes of monitoring/ensuring compliance with applicable rules and policies. (Amended 05/12)

MLS participants may not use IDX-provided listings for any purpose other than IDX display. This does not require participants to prevent indexing of IDX listings by recognized search engines. (Amended 05/12)

Listings or property addresses of sellers who have directed their listing brokers to withhold their listing or property address from display on the Internet (including, but not limited to, publicly accessible websites or VOWs) shall not be accessible via IDX display. (Amended 05/12)

Participants may select the IDX listings they choose to display based only on objective criteria including, but not limited to, factors such as geography or location ("uptown", "downtown", etc.), list price, type of property (e.g., condominiums, cooperatives, single family detached, multi-family), cooperative compensation offered by listing brokers, type of listing (e.g., exclusive right-to-sell or exclusive agency), or the level of service provided by the listing firm. Selection of IDX listings to be displayed must be independently made by each participant. (Amended 05/12)

Participants must refresh all MLS downloads and displays automatically fed by those downloads not less frequently than every 12 hours. (Amended 11/14)

Except as provided elsewhere in this policy or elsewhere in an MLS's rules and regulations, an IDX display or participant engaging in IDX display may not distribute, provide, or make any portion of the MLS database available to any person or entity. (Amended 05/12)

When displaying listing content, a participant's or user's IDX display must clearly identify the name of the brokerage firm under which they operate in a readily visible color and typeface. This policy acknowledges that certain required disclosures may not be possible in displays of minimal information (e.g., "thumbnails", text messages, "tweets", etc., of 200 characters or less) or for audio delivery of listing content. Minimal displays are exempt from the disclosure requirements established in this policy but only when linked directly to a display that includes all required disclosures. Audio delivery of listing content is exempt from the disclosure requirements only when all required disclosures are subsequently delivered electronically to the registered consumer performing the property search or linked to through the device's application. (Amended 05/17)

With respect to any participant's IDX display that (a) allows third-parties to write comments or reviews about particular listings or displays a hyperlink to such comments or reviews in immediate conjunction with particular listings, or (b) displays an automated estimate of the market value of the listing (or hyperlink to such estimate) in immediate conjunction with the listing, either or both of those features shall be disabled or discontinued with respect to the seller's listing at the request of the seller. The listing broker or agent shall communicate to the MLS that the seller has elected to have one or both of these features disabled or discontinued by all participants. Except for the foregoing and subject to paragraph 9, a participant's IDX display may communicate the participant's professional judgment concerning any listing. Nothing shall prevent an IDX display from notifying customers that a particular feature has been disabled at the request of the seller. (Amended 05/12)

Participants shall maintain a means (e.g., e-mail address, telephone number) to receive comments about the accuracy of any data or information that is added by or on behalf of the participant beyond that supplied by the MLS and that relates to a specific property. The participant shall correct or remove any false data or information relating to a specific property upon receipt of a communication from the listing broker or listing agent for that property explaining why the data or information is false. However, the participant shall not be obligated to remove or correct any data or information that simply reflects good faith opinion, advice, or professional judgment. (Amended 05/12)

An MLS participant (or where permitted locally, an MLS subscriber) may co-mingle the listings of other brokers received in an IDX feed with listings available from other MLS IDX feeds, provided all such displays are consistent with the IDX rules, and the MLS participant (or MLS subscriber) holds participatory rights in those MLSs. As used in this policy, "co-mingling" means that consumers are able to execute a single property search of multiple IDX data feeds resulting in the display of IDX information from each of the MLSs on a single search results page; and that participants may display listings from each IDX feed on a single webpage or display. (Adopted 11/14)

Participants shall not modify or manipulate information relating to other participants' listings. MLS participants may augment their IDX displays of MLS data with applicable property information from other sources to appear on the same webpage or display, clearly separated from the data supplied by the MLS. The source(s) of the information must be clearly identified in the immediate proximity to such data. This requirement does not restrict the format of MLS data display or display of fewer than all of the available listings or fewer authorized fields. (Adopted 05/15)

An MLS participant's DX display must identify the listing firm in a reasonably prominent location and in a readily visible color and typeface not smaller than the median used in the display of listing data. (Amended 11/17))

Figure 5:
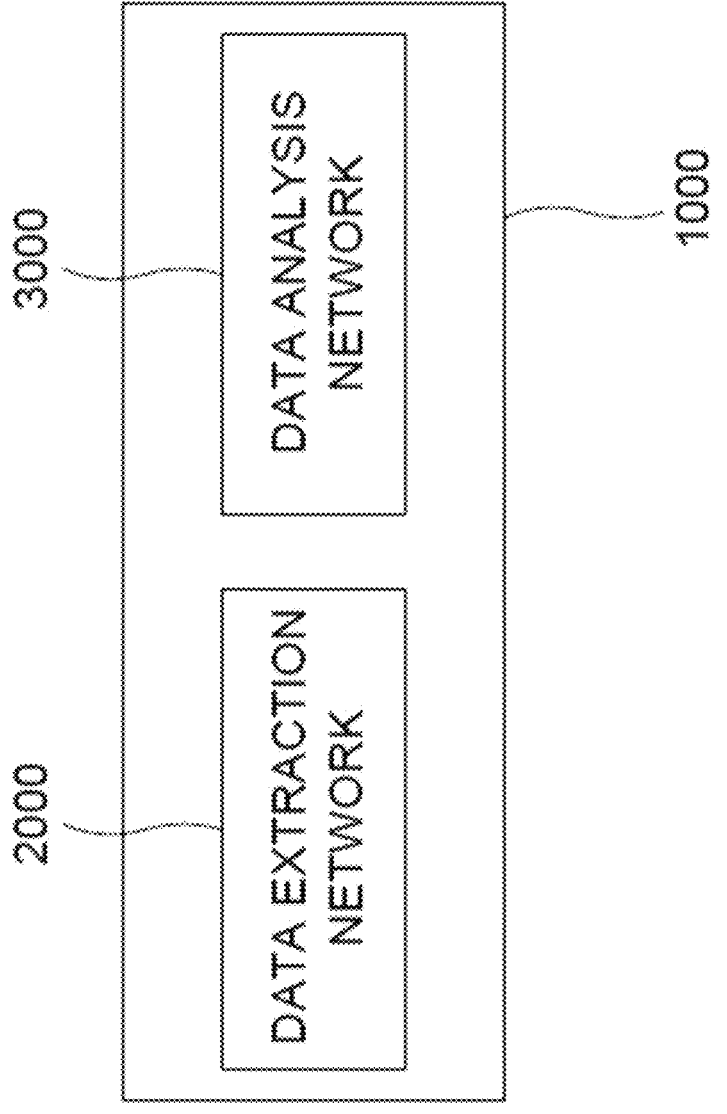
FIG. 5 is block diagram of an AI based system for identifying non-compliance incidences for MLS subscribers based on input data from disparate sources, and also triggering computer-based resolution methods for resolving the incidences.
Figure 6:
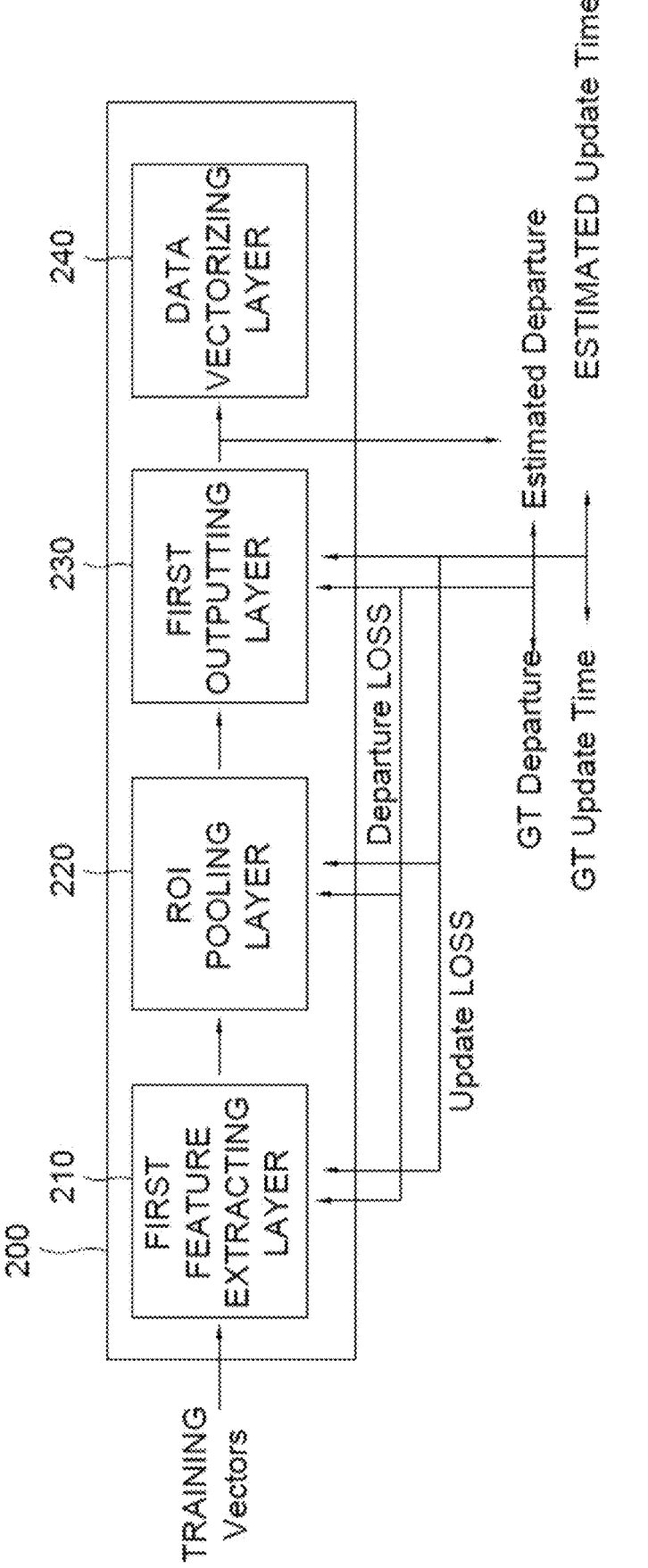
FIG. 6 is a block diagram of a data extraction network used for training an AI engine as used in an embodiment of the present disclosure.
Figure 7:
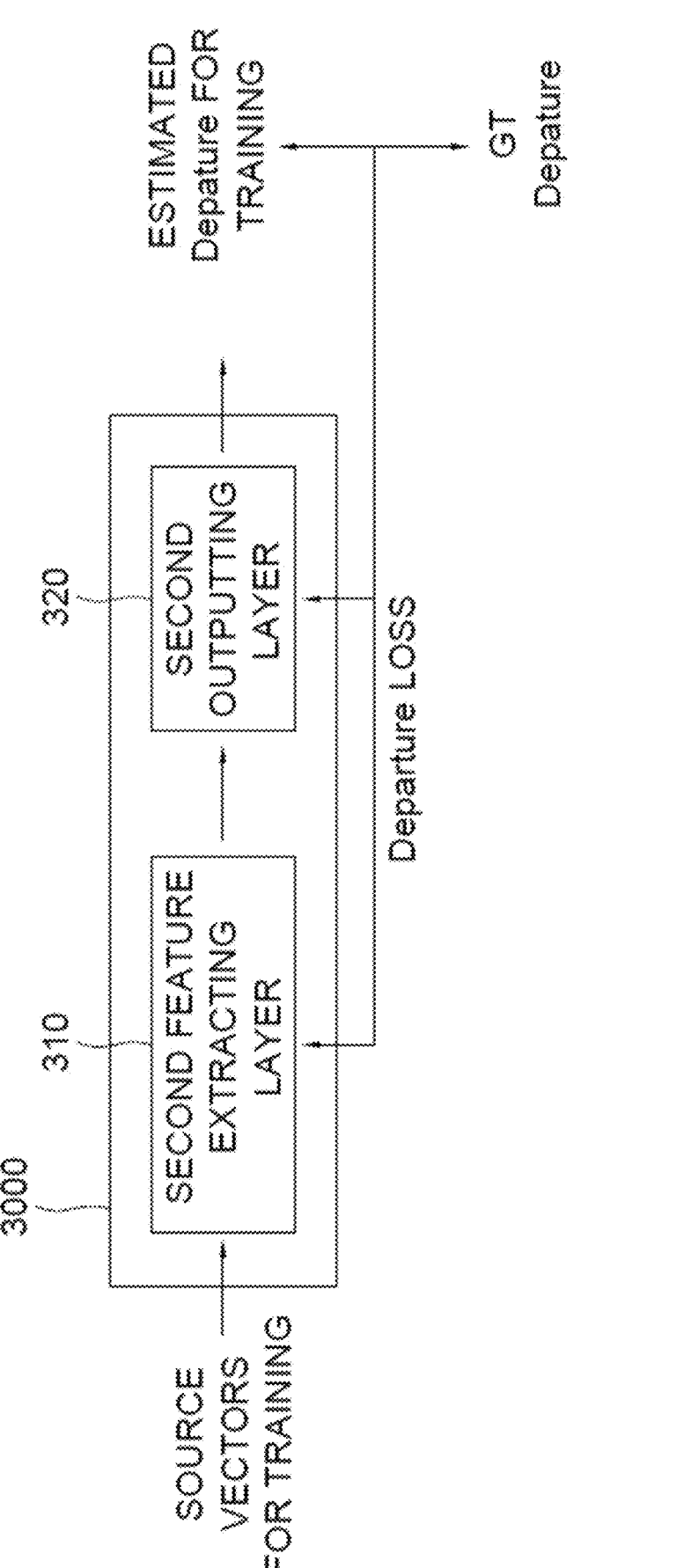
FIG. 7. is a block diagram of an AI-based data analysis network as used in an embodiment of the present disclosure.
Figure 8:
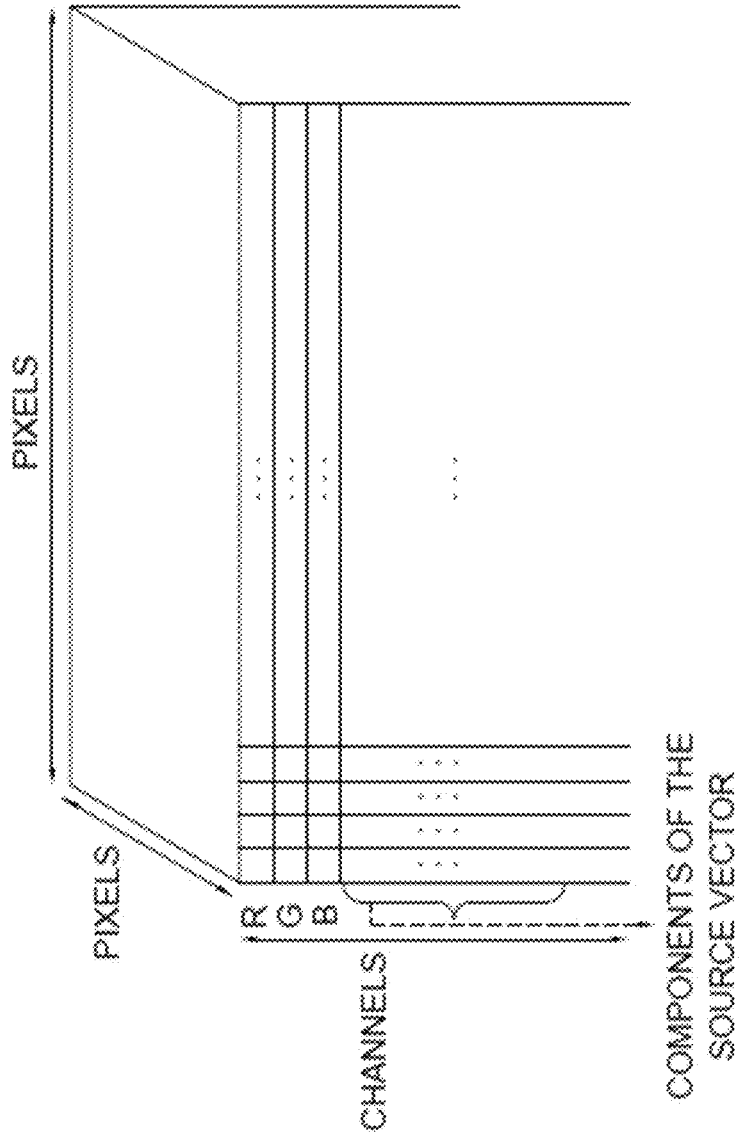
FIG. 8 is a concatenation source feature map, which may be used for graphical analyses of images, as used in an embodiment of the present disclosure.

Any of the above requirements may be used as features for training the AI engine discussed in more detail with respect to FIGS. 5-7.

Policies Applicable to Multiple Listing Services

The following guidelines are recommended but not required to conform to National Association policy. MLSs may:

prohibit display of expired, withdrawn, or sold listings (Amended 11/15)

prohibit display of confidential information fields intended for cooperating brokers rather than consumers including compensation offered to other MLS participants, showing instructions, property security information, etc.

prohibit display of the type of listing agreement, e.g., exclusive right to sell, exclusive agency, etc.

prohibit display of seller' s(s') and occupant's(s') name (s), phone number(s), and e-mail address(es)

require that the identity of listing agents be displayed require that any display of other participants' listings indicate the source of the information being displayed require that other brokers' listings obtained from other sources, e.g., from other MLSs, from non-participating brokers, etc., display the source from which each such listing was obtained require participants to indicate on their websites and in any other IDX display that the information being provided is for consumers' personal, non-commercial use and may not be used for any purpose other than to identify prospective properties consumers may be interested in purchasing. (Amended 05/12)

establish reasonable limits on the amount of data/number of listings that consumers may retrieve or download in response to an inquiry. Such number shall be determined by the MLS, but in no instance may the limit be fewer than five hundred (500) listings or fifty percent (50%) of the listings available for IDX display, whichever is less. (Amended 11/17)

limit the right to display other participants' listings to a participant's office(s) holding participatory rights in the same MLS.

require a notice on all MLS data displayed indicating that the data is deemed reliable but is not guaranteed accurate by the MLS. Participants' IDX sites and displays may also include other disclaimers necessary to protect the participant and/or the MLS from liability. (Amended 05/12)

This policy acknowledges that the disclosures required under Subsections 5, 6, 7, 8, and 11 (above) may not be possible in displays of minimal information (e.g., "thumbnails", text messages, "tweets", etc., of 200 characters or less) or for audio delivery of listing content. Minimal displays are exempt from the disclosure requirements established in this policy but only when linked directly to a display that includes all required disclosures. Audio delivery of listing content is exempt from disclosure requirements only when all required disclosures are subsequently delivered electronically to the registered consumer performing the property search or linked to through the device's application. (Amended 5/17)

Any of the above guidelines may be used as "features" for training the AI engine, discussed in more detail with respect to FIGS. 5-7.

Some example roster data of brokers and realtors is provided in Attachment 2 of U.S. provisional patent application 63/240,622, previously cited and incorporated herein by reference.

The License Incident Manager (LIM)

LIM is a software-based process that uses digital communications over communication networks to check data disparate databases (e.g., roster data of brokers and realtors, and Trestle access log data) to determine whether a user is in good standing with respect to their contractual obligations and thus eligible to continue to have access to the MLS data. Moreover, the LIM searches disparate data sets of TRESTLE accessible databases, including the roster data from the MLS and the licensee data access history, so as to detect changes in status, office affiliation, or data access pattern that should raise an alert about a live license agreement. The LIM displays all such "Incidents" on one dashboard, which gives the MLS a concise view of the incidents, and puts tools in their hands to respond to the incidents.

The LIM also provides a historical incident history of a given license agreement, licensee, or vendor—empowering the MLS licensing staff with this historical context for the decision to accept new license requests from those parties.

LIM also auto-resolves incidents when it identifies the alert condition be resolved in the incoming data. For instance, if an incident is triggered on a license due to a signer having an MLS status of INACTIVE, and on the following iteration the signer's MLS status returns to ACTIVE, LIM will automatically resolve the incident.

LIM Incident Detection Process

The MLS accepts a license request and all parties complete E-signing. LIM stores the initial state of the contract and all signers:

Data Vendor

Broker (optional)

Name

MLS ID

MLS Status

Office ID

Office's MLS Status

Agent (optional)

Name

MLS ID

MLS Status

Office ID

Office's MLS Status

Periodically the LIM runs the following checks against the MLS's membership data:

Is the Broker's status "ACTIVE"?

Is the Agent's status "ACTIVE"?

Is the Broker's office ID the same as when they signed the contract?

Is the Agent's office ID the same as when they signed the contract?

Is the Broker's office status "ACTIVE"?

Is the Agent's office status "ACTIVE"?

Periodically the LIM runs the following checks against the Vendor's data access history:

Has the vendor accessed data referenced by this license in the last 12 hours?

For each of the above tests that are NO, create a new Incident.

Create an Incident for a license that is manually suspended by the MLS or Vendor Create an Incident for each license on a data connection suspended by the MLS or Vendor.

A new License Incident at least captures:

Incident Reason

Incident Start Date

The specific change of data (including the values before and after the change).

For each currently active incident, periodically check to see whether the triggering condition is resolved. If it is, the Incident is marked resolved (and the Resolution Date is stored).

Daily, email the MLS a summary of Incidents opened and automatically resolved in the last day.

One example of how a change is detected is now discussed. A contract between the customer MLS, a Technology Provider (TP) and a Broker requires that the Broker's MLS membership be in good standing. LIM periodically examines a MemberStatus field of that Broker's record in the MLS roster data. (See "MemberStatus" in Attachment 2, previously cited). If that field's value changes from "Active" to "Inactive", LIM identifies that change and creates an Incident that alerts the MLS to this change. Later, if the MLS has not already taken an action to resolve the Incident, LIM detects the MemberStatus value changing back to "Active", and LIM auto-closes the Incident.

In another example, suppose a contract exists between an MLS, a TP, a Broker, and an Agent. The TP provides services to the Agent (a web site featuring live MLS data display, for instance) and the Broker co-signs to authorize the data access. LIM periodically checks the MemberOfficeMlsId values for the Agent and the Broker in the MLS roster data (See "MemberOfficeMlsId" in Attachment 2, previously cited). Changes to the Office membership imply a change in business relationship, which potentially undoes the signing authority of the parties to the contract. LIM creates an incident alerting the MLS to this change.

LIM User Interface

FIG. 1A is an example of one exemplary embodiment of a LIM graphical user interface, which presents on a display all active License Incidents for a particular MLS, with the ability to expand each row to see details. FIG. 1C is a data structure for data entries that may be presented in the GUI of FIG. 1A. Data fields in the data structure of FIG. 1C include contract identifier "Contract ID" 10, technology provider "TP" 11, "broker/agent" 12, "reason" 13, and display URL(s) 14. As an example, the first entry in FIG. 1A has corresponding data fields of the data structure of FIG. 1C populated with the following entries:

Contract ID: 123123

Technology Provider: Constellation Web Services

Broker/Agent: Mike Nesmith, Peter Tork

Reason: Agent Suspended in MLS

Display URL(s): http://torkhomes.com

FIG. 1B is another embodiment of a LIM graphical user interface. FIG. 1D is a data structure for data entries that may be presented in the GUI of FIG. 1B. Data fields in the data structure of FIG. 1D include Technology provider "TP" 11, "broker/agent" 12, "reason" 13, "Incident State Date" 15, and display URL(s) 14. Data fields 11, 12, 13 and 14 are the same as for the data structure of FIG. 1C, although it further includes the incident start date data field 15, which includes the date on which an incident is first detected.

FIG. 2A illustrates an expanded row for the first entry of FIG. 1A. Each incident includes several user-selectable options for acting on it from marking it resolved (i.e., ignoring it), snoozing on it" for a period of time (e.g., 2 weeks), terminating the contract, or suspending the data connection. As shown in the more detail listing of FIG. 2, the agent "Peter Tork" is listed as INACTIVE, and thus user-prompts are generated by LIM and displayed for user interaction to "mark resolved", "snooze 2 weeks", "deactivate contract", or "suspend data connection". Alternative, the AI engine may automatically control the resolution process without human involvement.

FIG. 2B is an example of an alternative expanded view of the GUI with the last entry expanded, and showing the agent "Ruth Hayles" as not being found, and the Broker status as "Inactive", both of which are triggers for recording an incident date, and for starting a resolution process. Similar to FIG. 2A, the GUI in FIG. 2B displays user-prompts for how to handle the incident. As with FIG. 2A, the AI engine may also automatically control the resolution process without human involvement.

FIG. 3 is a table of stored entries that illustrates an example access log excerpt which may also be checked to confirm compliance with MLS obligations. Data fields in the data structure include "company name" 30, timestamp 31, client ID 32, and MLOName 33. An attempted access by an authorized user, or an attempted access by a user that should have had their access rights terminated, may be retroactively checked by the processes discussed herein to identify and terminate access to those users.

Figure 4:
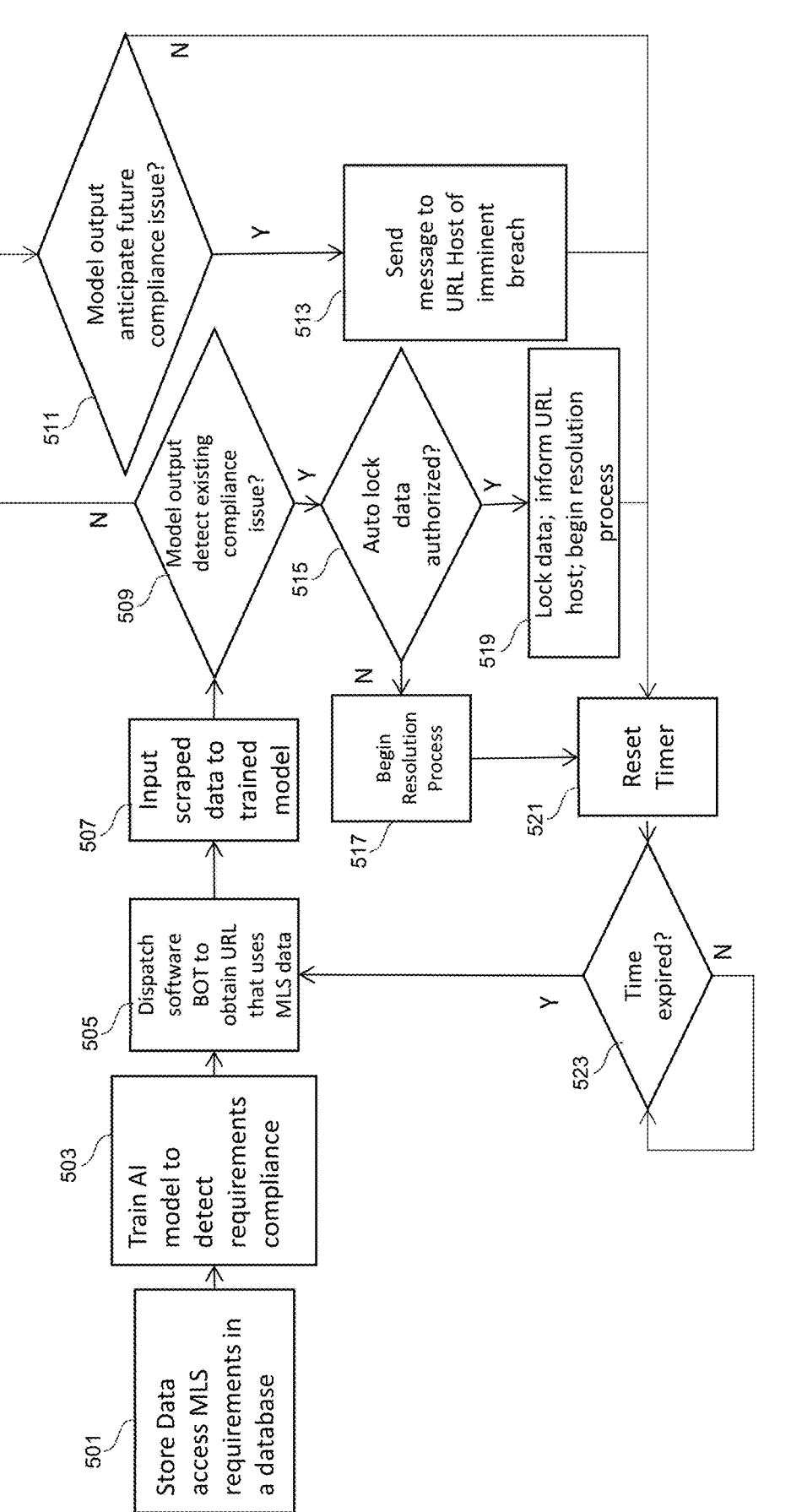
FIG. 4 is a flowchart of a process performed according to the present disclosure.

FIG. 4 is a flowchart of a computer-based process flow performed according to an embodiment. The process begins in step 501, where MLS requirements (previously cited with respect to Attachment 1 of U.S. provisional application 63/240,622) in a database. The requirements, are used as a basis for compliance with MLS requirements to be verified by the LEVI. The process then proceeds to step 503 where an AI model is trained using the MLS requirements and numerous example websites, and roster data records. FIGS. 5-8 will discuss the training process in more detail. In FIG. 4, the process then proceeds to step 505 where a software "bot" (a software process that may serve as a "robot" to, for example, scrape the MLS-related data from a website of the MLS subscriber at regular, or user definable intervals) is dispatched to a particular URL that has compliance obligations to a MLS for how it handles MLS data. The bot obtains data from the website and applies the data to the trained model (AI engine) in 507. The bot may be a software-based computer process that autonomously visits a site, extracts data from it, and stores it locally for evaluation by LIM.

Output from the AI engine are then subject to a query in 509 regarding whether an existing compliance issue is detected. If the response is negative, the process proceeds to the next query in 511. However, if the response to the query in 509 is affirmative, the process checks in step 515 whether permission is granted to auto-lock access to the MLS data from the contracting entity. If the response is negative, the process proceeds to step 517 where a resolution process begins. However, if the response is affirmative, the data is locked, the URL host is informed, and then the resolution process begins.

If, the response to the query in 509 is negative, the process proceeds to step 511 where the AI model anticipates whether a compliance issues is likely (more often than not, or some other user-selectable threshold) to occur in the near future. If the response is negative, the process proceeds directly to step 521. However, if the response is affirmative, the process sends a message to the URL host in step 513 that a breach is expected to occur in the short term so the URL host can take affirmative action. Then, the process proceeds to step 521.

In step 521 a timer is reset (e.g., 1 day, 3 days, or a week) and the process proceeds to the query in step 523, where the predetermined time is monitored. Once the time has elapsed, the process returns to step 505 for the process to repeat.

In reference to FIGS. 5-8, an example of how a computing device 100 estimates the likely occurrence of a non-compliance event will occur via analysis of a departure of an agent from a broker, along with an estimate of when the MLS providers will update MLS files will be explained. While a real estate agent's departure and a failure to timely download updated MLS files may appear unrelated, using a trained AI engine, as will now be discussed, may be able to detect otherwise unforeseen patterns that result in MLS requirement, non-compliance detection.

First, by referring to FIG. 5, a configuration of the computing device 1000 will be explained. The computing device 1000 may include a data extraction network 2000 and a data analysis network 3000. Further, to be illustrated in FIG. 7, the data extraction network may include at least one first feature extracting layer 210, at least one Region-Of-Interest(ROI) pooling layer 220, at least one first outputting layer 230 and at least one data vectorizing layer 240. And, also to be illustrated in FIG. 6, the data analysis network 300 may include at least one second feature extracting layer 310 and at least one second outputting layer 320.

Below, specific processes of estimating whether a non-compliance event will occur will be explained. To begin with, a first embodiment of the present AI approach will be presented.

First, the computing device 1000 may acquire at least one subject file. By referring to Attachments 1 and 2, the subject file may correspond to an MLS service contracted by a brokerage with an agent.

After the data file is acquired, in order to generate a source vector to be inputted to the data analysis network 3000, the computing device 1000 may instruct the data extraction network 2000 to generate the source vector including (i) a detected presence of the agent as being newly registered as a real estate agent in an different geographic area, and (ii) a pattern of time at which the MLS service updates the data records for the MLS service.

In order to generate the source vector, the computing device 1000 may instruct at least part of the data extraction network 200 to detect the agent having registered in a different venue, and also a series of time windows when the MLS service has updated the data records, and times when the MLS service updated the records outside of the prescribed period of time for maintaining current records.

Specifically, in reference to FIG. 6, the computing device 1000 may instruct the first feature extracting layer 210 to apply at least one first convolutional operation to the subject file, to thereby generate at least one subject feature map. Thereafter, the computing device 1000 may instruct the region of interest (ROI) pooling layer 220 to generate one or more ROI-Pooled feature maps by pooling regions on the subject feature map, corresponding to ROIs on the subject data (e.g., components of a recent retrieval of the roster of brokers and agents) which have been acquired from a Region Proposal Network (RPN) interworking with the data extraction network 200. And, the computing device 100 may instruct the first outputting layer 230 to generate at least one estimated agent departure and at least one estimated MLS data update failure. That is, the first outputting layer 230 may perform a classification and a regression on the subject file, by applying at least one first Fully-Connected (FC) operation to the ROI-Pooled feature maps, to generate each of the estimated departure and the estimated data update failure. In this context, the features are components of the input data (e.g., data fields showing active/inactive status, location, etc. of a particular agent or broker), and those features are associated with a breakdown of detailed requirements specified in the MLS service contract (or license).

In this example, the computing device 1000 trains the data extraction network 2000 and the data analysis network 3000 to identify aspects within the training data that are associated with the particular agent or broker departing the entity that is obligated to the MLS to protect the MLS's data under the contract/license with the MLS. A similar process may be performed for whether the MLS subscriber has updated the MLS data according to the terms of the license. Similar training for other MLS rules/policies are applied as well.

After the apparent departure and the apparent data update failure are acquired, the computing device 1000 may instruct the data vectorizing layer 240 to generate at least one source vector including the apparent departure and the apparent update failure as at least part of its components.

Then, the computing device 1000 may instruct the data analysis network 3000 to calculate an estimated departure decision by using the source vector. Herein, in reference to FIG. 7, the second feature extracting layer 310 of the data analysis network 3000 may apply second convolutional operation to the source vector to generate at least one source feature map, and the second outputting layer 320 of the data analysis network 3000 may perform a regression, by applying at least one FC operation to the source feature map, to thereby calculate the estimated departure.

As shown above, the computing device 1000 may include two neural networks, i.e., the data extraction network 2000 and the data analysis network 3000. The two neural networks should be trained to perform said processes properly. Below, more particular training of the two neural networks will be explained by referring to FIG. 6 and FIG. 7.

First, by referring to FIG. 6, the data extraction network 2000 may have been trained by using (i) a plurality of training files corresponding to actual agents, some of whom of have departed and some of whom have remained, after it was detected they acquired new real estate licenses in at least one different venue. More specifically, the data extraction network 2000 may have applied aforementioned operations to the training files, and have generated their corresponding estimated departures. Then, (i) each of departures pairs of each of the estimated departures and each of their corresponding GT departures and (ii) each of MLS update pairs of may have been referred to, in order to generate at least one departure loss and at least one update, by using any of loss generating algorithms, e.g., a smooth-L1 loss algorithm and a cross-entropy loss algorithm. Thereafter, by referring to the departure loss and the update loss, backpropagation may have been performed to learn at least part of parameters of the data extraction network 2000. Parameters of the RPN can be trained also, but a usage of the RPN is a well-known prior art, thus further explanation is omitted.

Herein, the data vectorizing layer 240 may have been implemented by using a rule-based algorithm, not a neural network algorithm. In this case, the data vectorizing layer 240 may not need to be trained, and may just be able to perform properly by using its settings inputted by a manager.

As an example, the first feature extracting layer 210, the ROI pooling layer 220 and the first outputting layer 230 may be acquired by applying a transfer learning, which is a well-known prior art, to an existing object detection network such as VGG or ResNet, etc.

Second, by referring to FIG. 7, the data analysis network 3000 may have been trained by using (i) a plurality of source vectors for training, including apparent agent departure for training, and (ii) a plurality of their corresponding GT departures. More specifically, the data analysis network 3000 may have applied aforementioned operations to the source vectors for training, to thereby calculate their corresponding estimated departure for training. Then each of departure pairs of each of the estimated departures and each of their corresponding GT departures may have been referred to, in order to generate at least one departure loss, by using said any of loss algorithms. Thereafter, by referring to the departure loss, backpropagation can be performed to learn at least part of parameters of the data analysis network 3000.

After performing such training processes, the computing device 1000 can properly calculate the estimated agent by using the subject file. Similarly, the computer device 1000 can estimate an occurrence of a data update failure of MLS data within the prescribed time window.

Hereafter, other embodiments will be presented.

As another embodiment, rather than predict a departure of an agent or failure to timely download MLS data, compliance with a size characteristic of an MLS logo is checked via a review of data from the host URL's website to check for compliance. In this case, the source vector, can be concatenated channel-wise to the subject image or its corresponding subject segmented feature map, which has been generated by applying an image segmentation operation thereto, to thereby generate a concatenated source feature map, and the data analysis network 3000 may use the concatenated source feature map to calculate the estimated logo size. An example configuration of the concatenated source feature map may be shown in FIG. 8. In this case, the data analysis network 3000 may have been trained by using a plurality of concatenated source feature maps for training including the source vectors for training, other than using only the source vectors for training. By using this embodiment, much more information can be inputted to processes of calculating the estimated logo size, thus it can be more accurate. Herein, if the subject image is used directly for generating the concatenated source feature map, it may require too much computing resources, thus the subject segmented feature map may be used for reducing a usage of the computing resources.

The above is an example (MLS logo compliance) of a machine-vision trained AI to inspect a vendor's web pages and score them for compliance with MLS and NAR rules. Rather than have a third party check for compliance, the trained model may be used for self-check compliance by running the AI compliance checker against their own platform (send it a URL or upload screenshots).

In addition to image analysis, the AI model may use a text parser to check for requirements compliance features by first detecting and extracting an individual MLS's terms.

Similar to the example provided above for compliance with update MLS records within a required time-frame, other pattern-detection of TP and Member's business relationship activity may be performed as well, such as. every third month 30% of agents terminate their contract, every 8th month their payment is late. Moreover, using the AI engine, detection of seemingly unrelated events may in fact follow a pattern that proactively detect upcoming non-compliance behavior.

As yet a further example, the AI model may be trained to detect the TP's customer churn to provide a TP stability score, which could be a new metric an MLS might use to decide whether to license data to an unknown TP. In turn this would help them evaluate the value a TP is providing to Members in their market.

As yet another example, the AI model may be used to expose trends of customer activation/deactivation to TPs so as to let them know the member has been through a series of other web site providers before hiring them.

Figure 9:
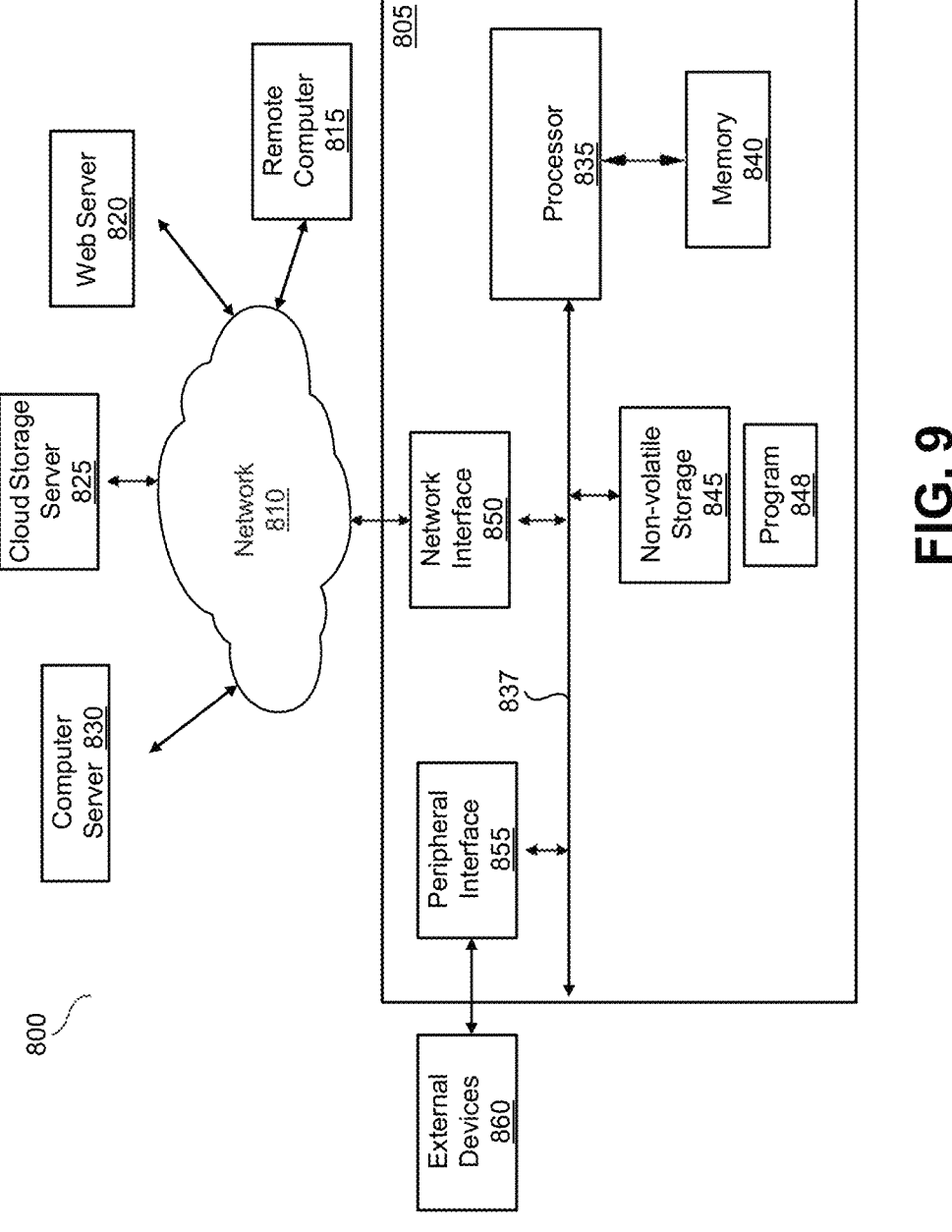
FIG. 9 is a block diagram of a computer-based system on which embodiments of the present system may be implemented.

FIG. 9 illustrates a block diagram of a computer that may implement the various embodiments described herein.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 9 is a functional block diagram illustrating a networked system 800 of one or more networked computers and servers. In an embodiment, the hardware and software environment illustrated in FIG. 9 may provide an exemplary platform for implementation of the software and/or methods according to the present disclosure.

Referring to FIG. 9, a networked system 800 may include, but is not limited to, computer 805, network 810, remote computer 815, web server 820, cloud storage server 825 and computer server 830. In some embodiments, multiple instances of one or more of the functional blocks illustrated in FIG. 9 may be employed.

Additional detail of computer 805 is shown in FIG. 9. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, Display-Port and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A computer-implemented method of detecting multiple-listing-service (MLS) contract compliance for a MLS, the method comprising:

gathering MLS-related data regarding an MLS subscriber, wherein the MLS-related data includes data associated with a particular broker or a particular agent of the MLS subscriber, from at least one database;

detecting by a computer a non-compliance incident from input data that contains MLS service requirements as features of the input data that correspond to contractual obligations of the MLS subscriber under a MLS license, the detecting includes associating specific changes in MLS-related data, including at least one of a change in active/inactive status of a broker or an agent, adherence to MLS internet data exchange (IDX) policies, MLS logo compliance, or a change in broker office ID of the broker or the agent, with corresponding non-compliance incidents; and in response to detection of the non-compliance incident, triggering a computer-based resolution process to resolve the non-compliance incident, wherein the computer-based resolution process to resolve the non-compliance incident includes an auto-locking process that blocks access to a web-site that hosts live data of the MLS by a particular broker or a particular agent that is associated with the non-compliance incident of the MLS subscriber under the MLS license.

2. The method of claim 1, wherein:

the gathering includes gathering the MLS-related data from a plurality of disparate sources, at least one of the plurality of disparate sources being a roster of brokers and realtors.

3. The method of claim 2, wherein:

the plurality of disparate sources also includes an access log that includes entries of previous accesses to the MLS.

4. The method of claim 3, wherein:

the detecting includes checking the access log with the computer to detect a pattern of accesses to the MLS by the particular broker or the particular agent.

5. The method of claim 2, wherein:

the plurality of sources also includes a source of at least a portion of the MLS IDX policies.

6. The method of claim 2, wherein:

the gathering includes repeatedly gathering the roster of brokers and realtors so as to capture updates in the roster of brokers and realtors.

7. The method of claim 2, wherein:

the gathering includes repeatedly gathering the roster of brokers and realtors so as to capture updates in the roster of brokers and realtors, and the detecting includes repeatedly checking the broker office ID for the particular broker or the particular agent so as to trigger the non-compliance incident in response to the change in the broker office ID.

8. The method of claim 1, further comprising:

in response to detection of the non-compliance incident, capturing in memory at least one of a reason that caused the non-compliance incident, a start date of the non-compliance incident, and a change of data associated with data that caused the non-compliance incident.

9. The method of claim 1, further comprising:

executing the computer-based resolution process to resolve the non-compliance incident.

10. The method of claim 9, wherein:

the computer-based resolution process to resolve the non-compliance incident includes causing a display of user-selectable prompts, and responding to a selection of the user-selectable prompts by executing a corresponding process.

11. The method of claim 1, wherein:

the gathering includes dispatching a software-bot to scrape the MLS-related data from a website of the MLS subscriber.

12. The method of claim 11, wherein the MLS-related data includes a logo, and the computer is configured to detect a deviation of the logo with respect to the MLS service requirements.

13. A computer based system that detects multiple-listing-service (MLS) contract compliance for a MLS, the system further comprising:

a memory that includes computer-readable instructions stored therein; and processing circuitry configured to execute the computer-readable instructions so as to configure the processing circuitry to gather MLS-related data regarding an MLS subscriber, wherein the MLS-related data includes data associated with a particular broker or a particular agent of the MLS subscriber, from at least one database, detect a non-compliance incident from input data that contains MLS service requirements as features of the input data that correspond to contractual obligations of the MLS subscriber under a MLS license, wherein detection of the non-compliance incident includes associating specific changes in MLS-related data, including at least one of a change in active/inactive status of a broker or an agent, adherence to MLS internet data exchange (IDX) policies, MLS logo compliance, or a change in broker office ID of the broker or the agent, with corresponding non-compliance incidents, and in response to detection of the non-compliance incident, trigger a computer-based resolution process to resolve the non-compliance incident, wherein the computer-based resolution process to resolve the non-compliance incident includes an auto-locking process that denies access to a web-site that hosts live data of the MLS to a particular broker or a particular agent that is associated with the non-compliance incident of the MLS subscriber under the MLS license.

14. The computer based system of claim 13, wherein:
the processing circuitry is configured to gather the MLS-related data from a plurality of disparate sources, at least one of the plurality of disparate sources being a roster of brokers and realtors.

15. The computer based system of claim 14, wherein:
the plurality of sources also includes an access log that includes entries of previous accesses to the MLS.

16. The computer based system of claim 15, wherein:
the processing circuitry is configured to check the access log to detect a pattern of accesses to the MLS by a particular broker or a particular agent.

17. A non-transitory computer readable storage device that has computer readable instructions stored therein that upon execution by a computer, cause the computer to implement a method of detecting multiple-listing-service (MLS) contract compliance with a MLS, the method comprising:

gathering MLS-related data regarding an MLS subscriber, wherein the MLS-related data includes data associated with a particular broker or a particular agent of the MLS subscriber, from at least one database;

detecting a non-compliance incident from input data that contains MLS service requirements as features of the input data that correspond to contractual obligations of the MLS subscriber under a MLS license, the detecting includes associating specific changes in MLS-related data, including at least one of a change in active/inactive status of a broker or an agent, adherence to MLS internet data exchange (IDX) policies, MLS logo compliance, or a change in broker office ID of the broker or the agent, with corresponding non-compliance incidents; and in response to detection of the non-compliance incident, triggering a computer-based resolution process to resolve the non-compliance incident, wherein the computer-based resolution process to resolve the non-compliance incident includes an auto-locking process that denies access to a web-site that hosts live data of the MLS to a particular broker or a particular agent that is associated with the non-compliance incident of the MLS subscriber under the MLS license.

* * * * *